Aug. 13, 1935.  B. A. PETERSON  2,011,115
MACHINE FOR OPERATING UPON WARPS
Filed June 5, 1933   12 Sheets-Sheet 2

FRONT VIEW Fig. 2.

INVENTOR
Burt A. Peterson
BY
ATTORNEYS

Aug. 13, 1935. B. A. PETERSON 2,011,115
MACHINE FOR OPERATING UPON WARPS
Filed June 5, 1933 12 Sheets-Sheet 6

INVENTOR
Burt A. Peterson
BY
ATTORNEYS

Aug. 13, 1935.     B. A. PETERSON     2,011,115
MACHINE FOR OPERATING UPON WARPS
Filed June 5, 1933     12 Sheets-Sheet 7
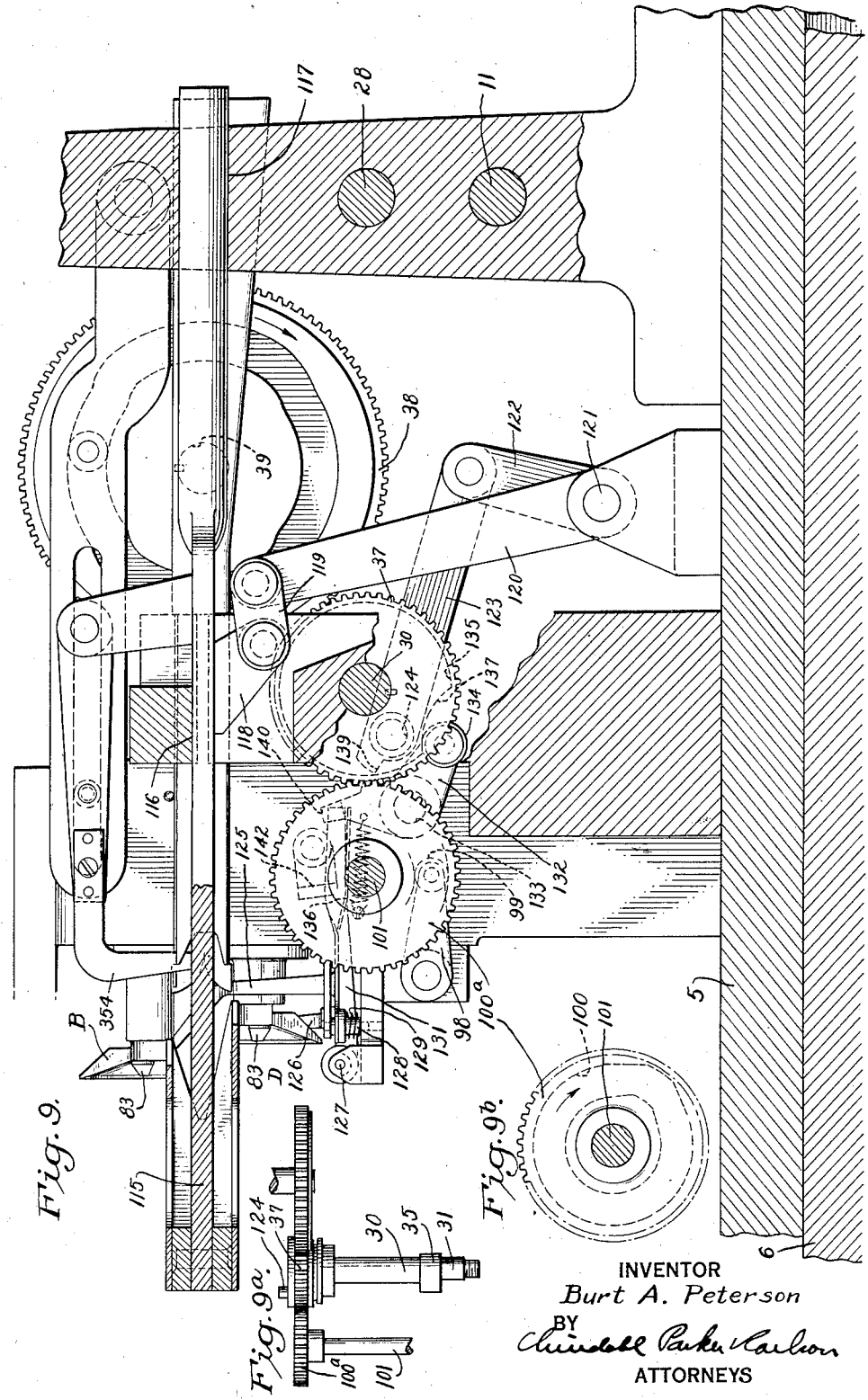
INVENTOR
Burt A. Peterson
BY
ATTORNEYS

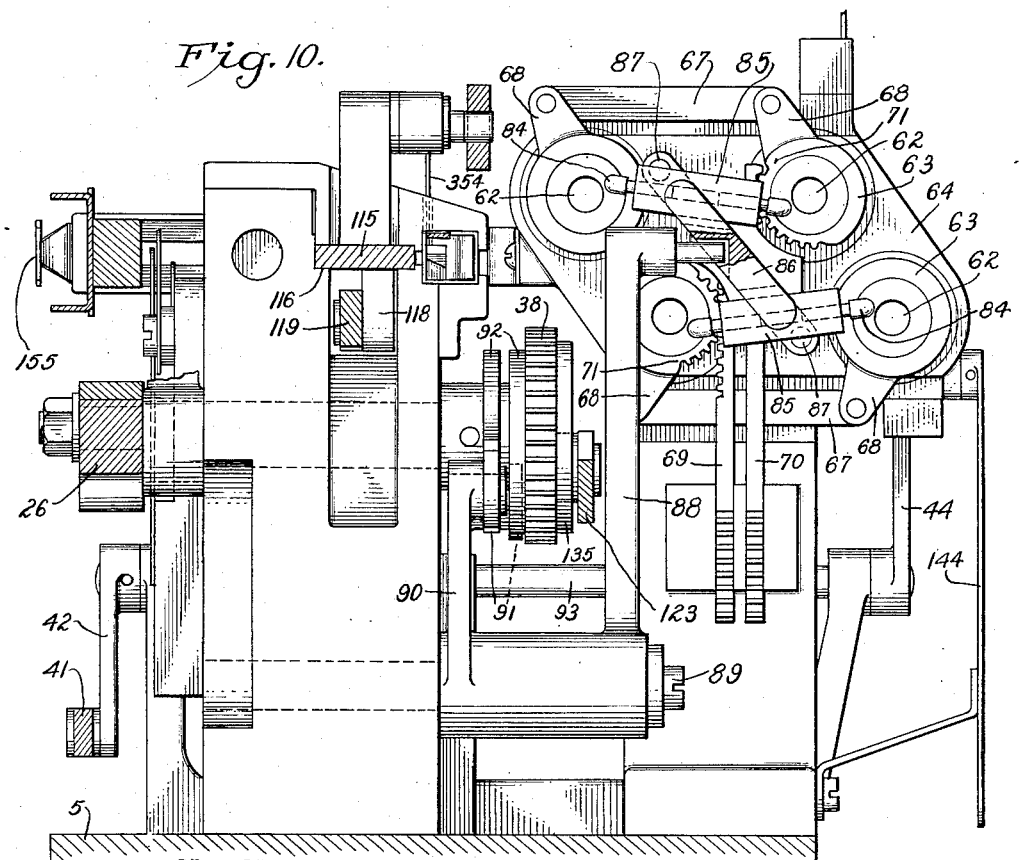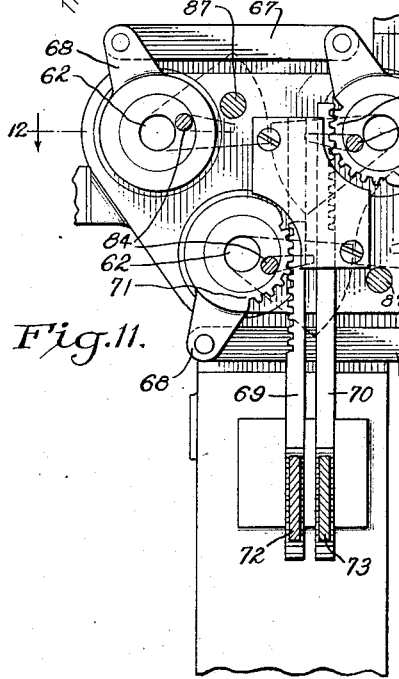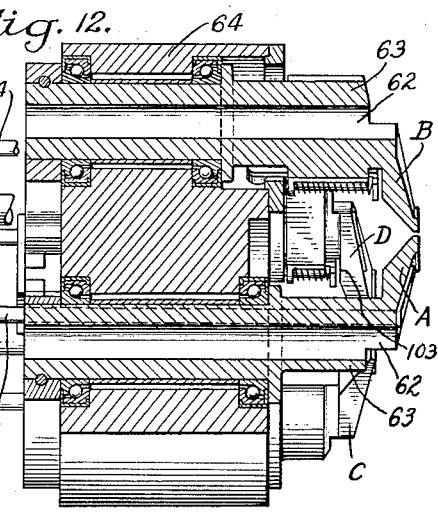

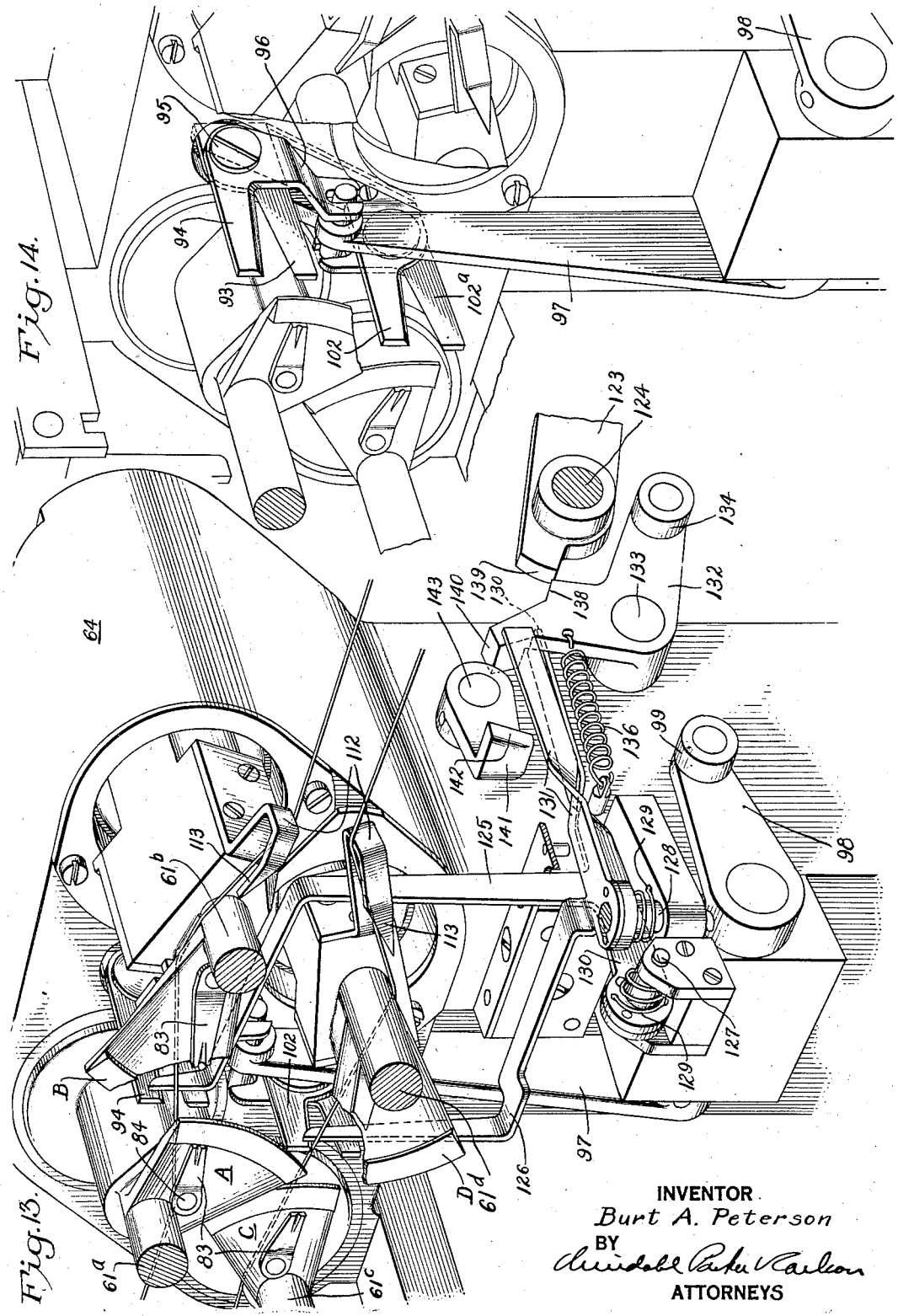

Aug. 13, 1935.　　　B. A. PETERSON　　　2,011,115
MACHINE FOR OPERATING UPON WARPS
Filed June 5, 1933　　12 Sheets-Sheet 10
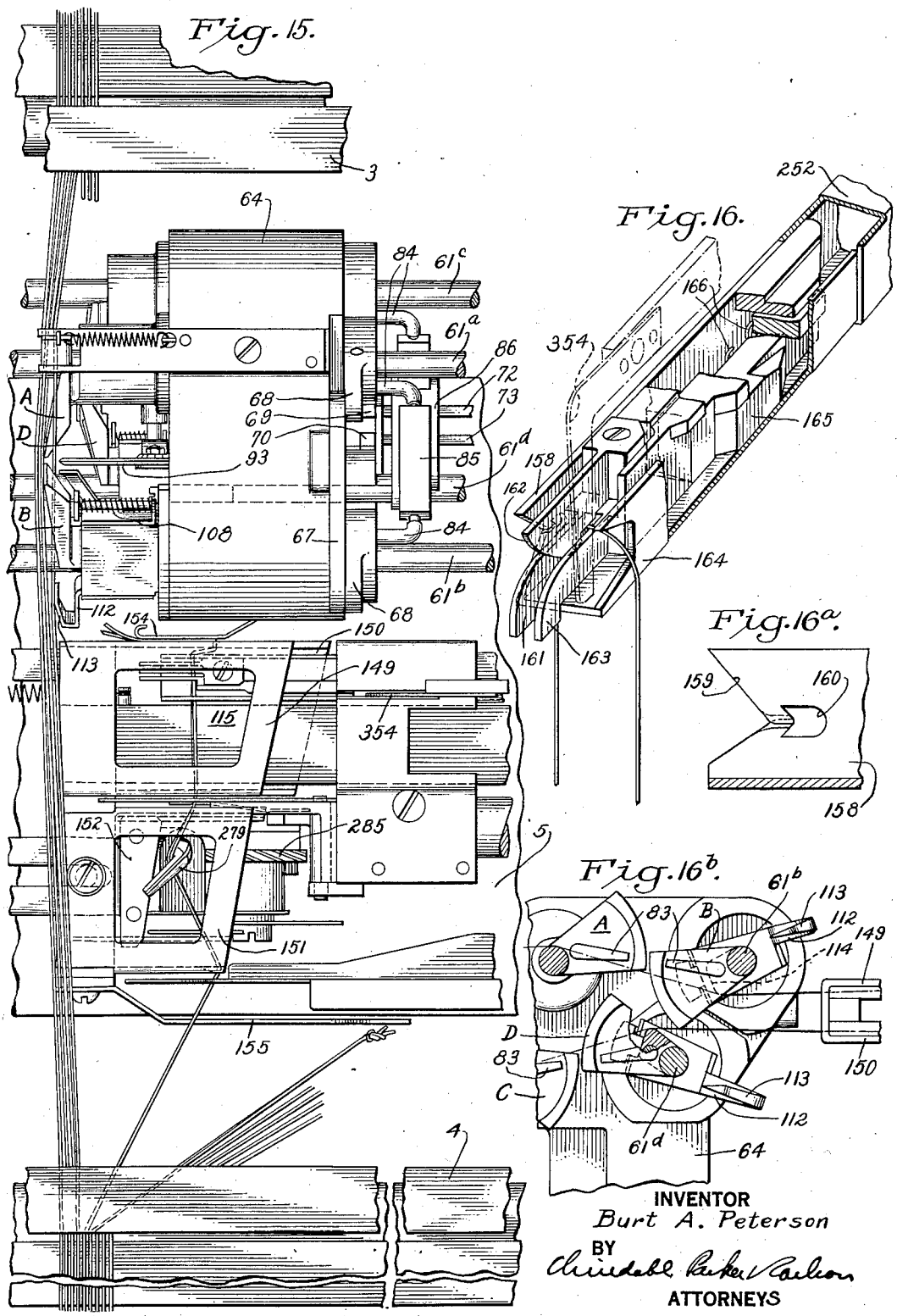
INVENTOR
Burt A. Peterson
BY
ATTORNEYS

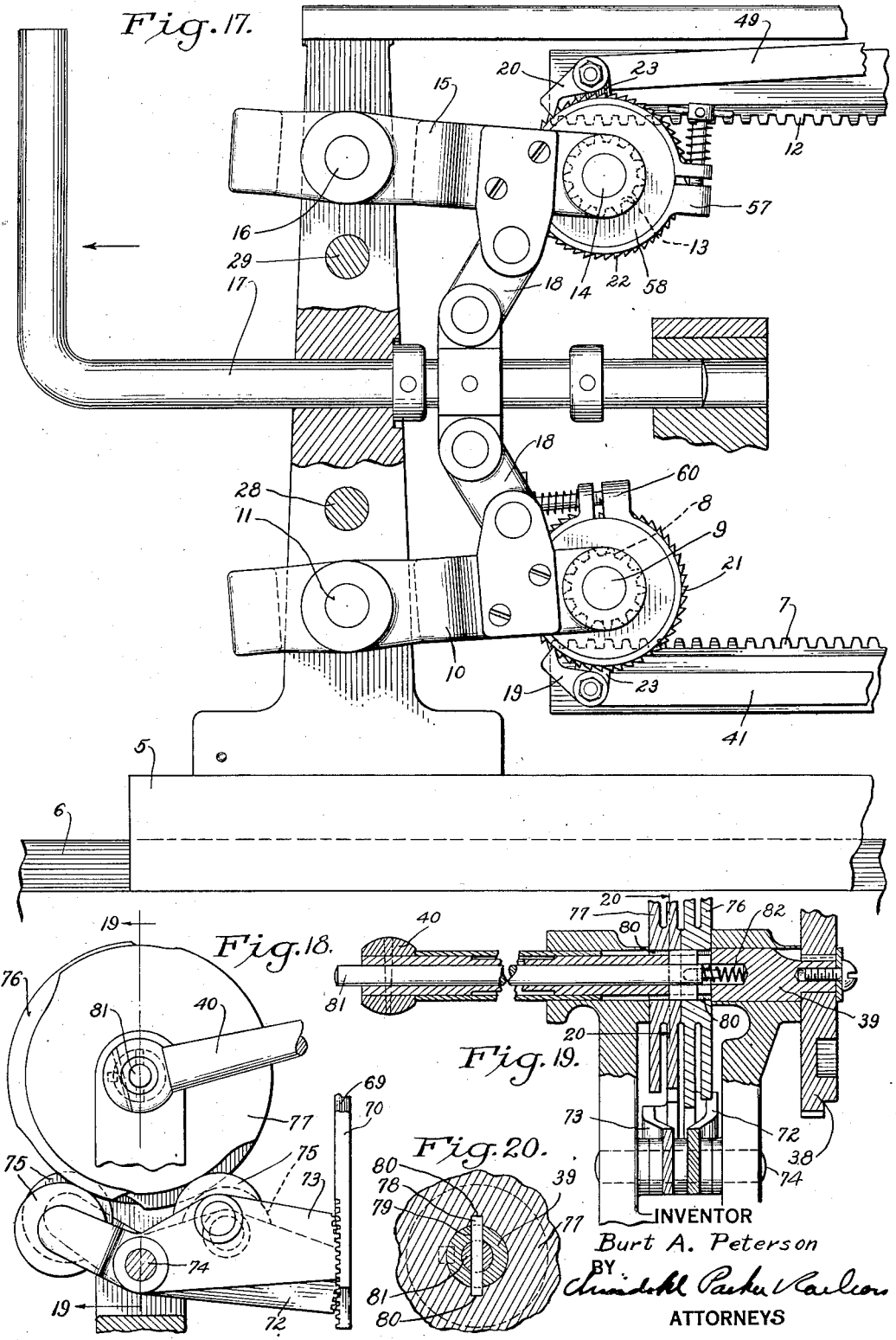

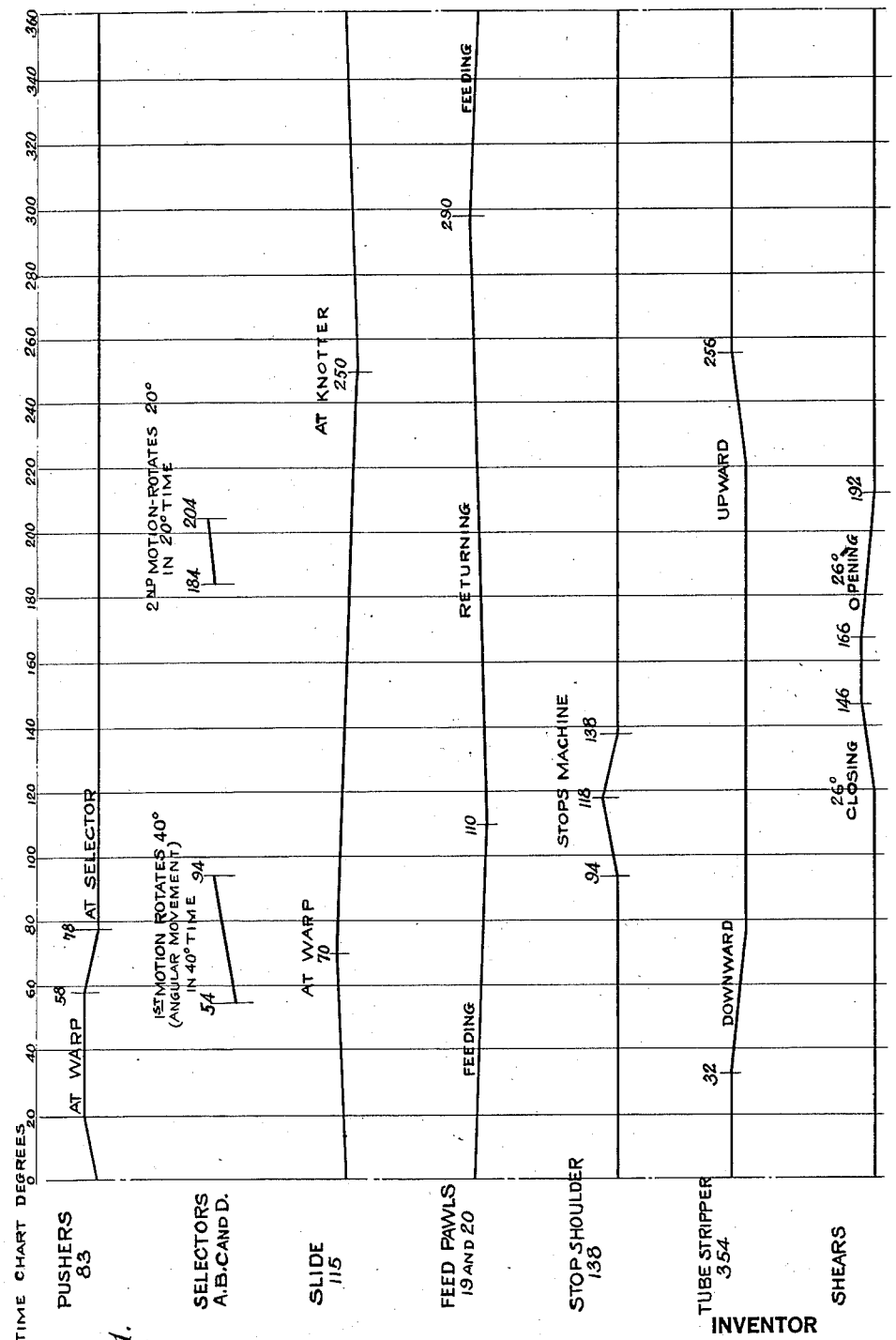

Patented Aug. 13, 1935

2,011,115

UNITED STATES PATENT OFFICE 2,011,115

MACHINE FOR OPERATING UPON WARPS

Burt A. Peterson, Rockford, Ill., assignor to Barber-Colman Company, Rockford, Ill., a corporation of Illinois Application June 5, 1933, Serial No. 674,289

27 Claims. (Cl. 28—49)

This invention relates to machines for operating upon warps, as, for example, warp-uniting and warp-drawing machines. The invention relates more particularly to mechanisms of such character and so organized as to be especially adapted for the handling of silk, rayon, celanese and similar yarns.

One of the objects of the invention is to provide improved means for selecting threads or yarns from a leased warp. In this respect the invention is an improvement upon the mechanisms disclosed in the Lanning and Hathaway Patent No. 1,147,412 dated July 20, 1915, the Bingham and Parker Patent No. 1,306,097 dated June 10, 1919, the Hammer Patent No. 1,779,312 dated October 21, 1930, and British Patent No. 308,791.

Rayon and celanese possess little elasticity as compared with cotton, consequently it is impracticable to hold a rayon or celanese warp in a loose clamp from which threads are to be pulled for manipulation, as in the before-mentioned Bingham and Parker patent. I therefore clamp the warp tightly and free the threads from the clamp, after selection, by severing them.

Because of the relatively low elasticity of rayon and celanese threads I have provided mechanisms for performing the desired operations upon such threads while placing a minimum amount of tension upon them.

Since rayon and celanese threads are relatively stiff and wiry they tend to spring out of control upon being severed. I therefore have provided means for keeping the threads under proper control from the moment they are severed until they are tied.

The invention further relates to the various features or improvements hereinafter set forth.

In the accompanying drawings:

Figure 1 is a vertical sectionl view taken approximately in the plane of dotted line 1—1 of Fig. 2, showing one form of machine embodying the features of my invention.

Fig. 1ᵃ illustrates the operation of the selector wings.

In all of Figs. 1 to 5 the parts are shown in the same position.

Figure 5:
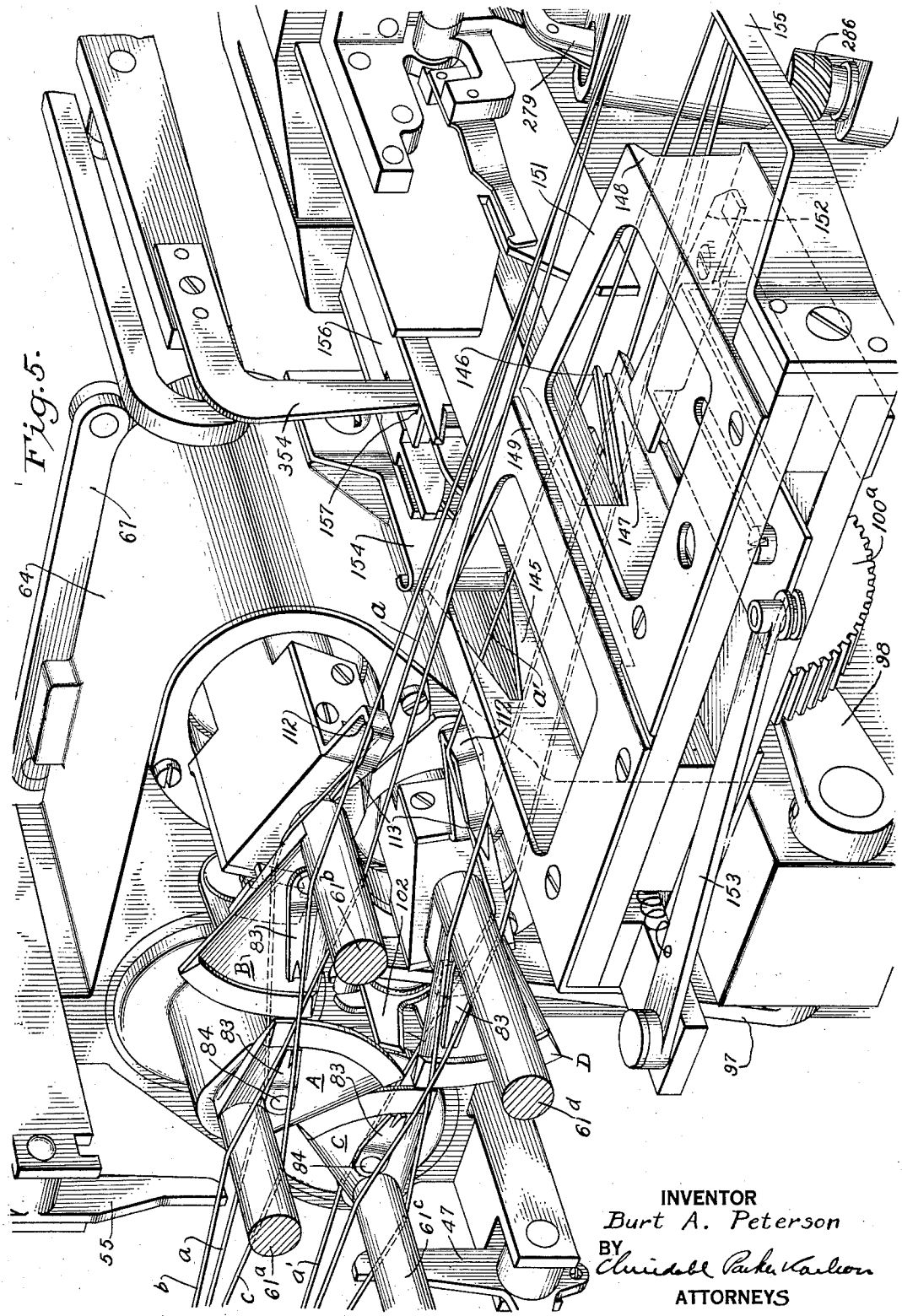
Fig. 5 is a perspective view of various of the mechanisms for operating upon the warp threads.
Figure 6:
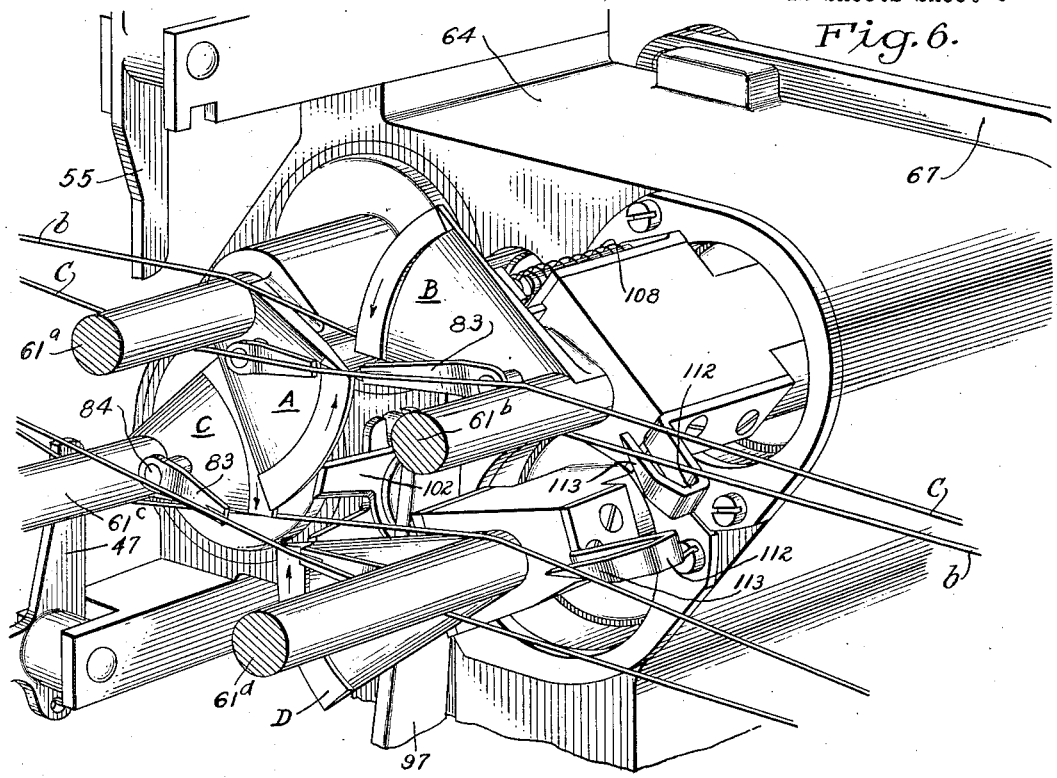

Fig. 6 is a perspective view of the selecting mechanism in a different position from that shown in Fig. 5.

Figures 7, 8:
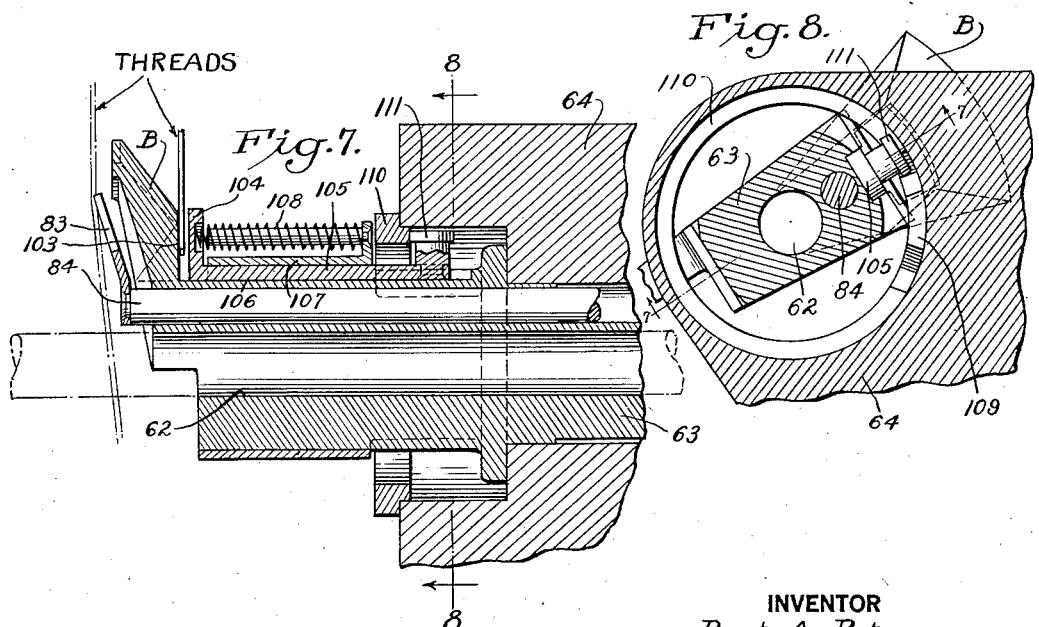

Fig. 7 is a sectional view, through one of the selectors, the view being taken in the plane of dotted line 7—7 of Fig. 8.

Fig. 8 is a section on line 8—8 of Fig. 7.

Figure 1:
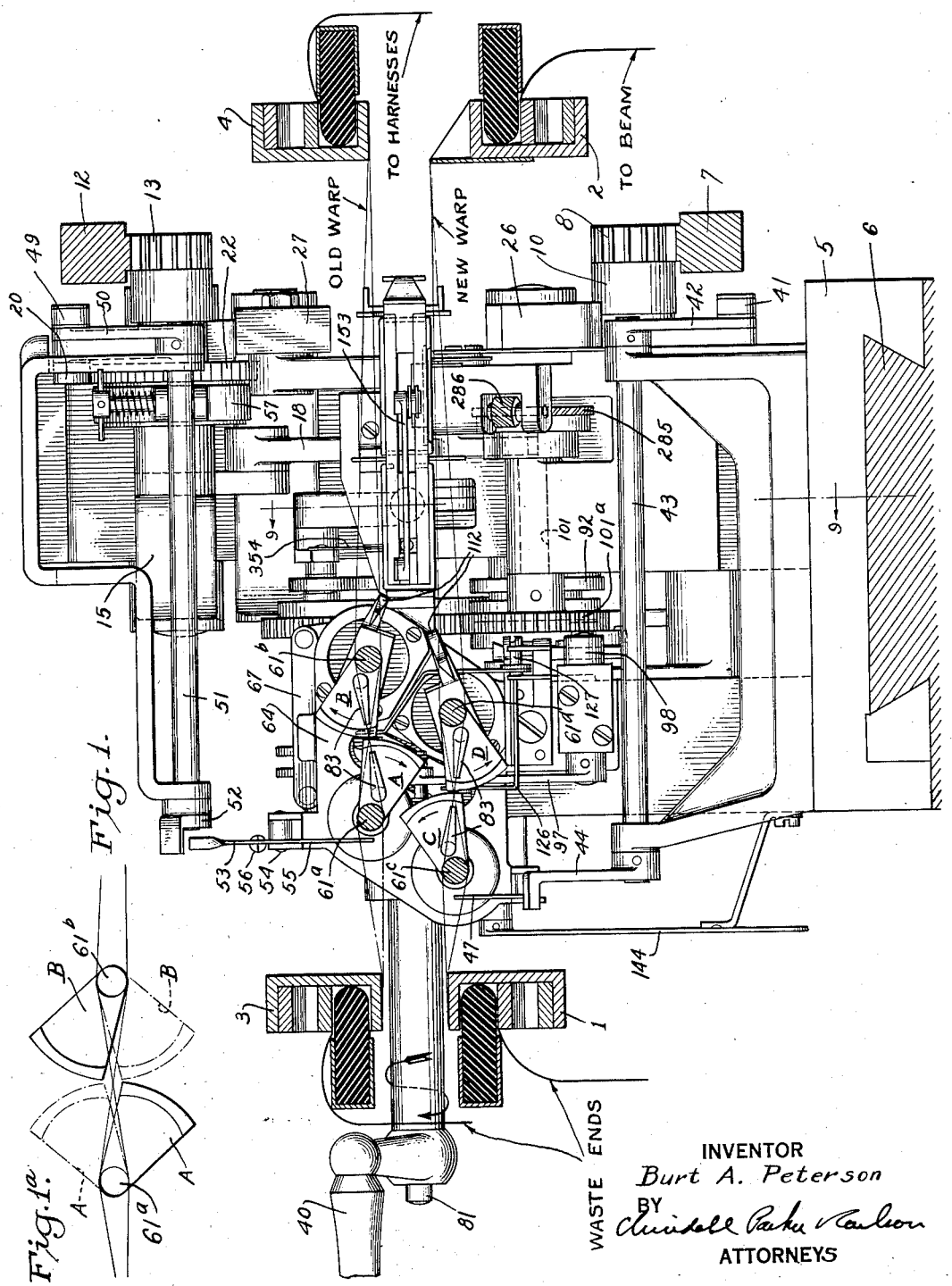

Fig. 9 is a vertical sectional view taken approximately in the plane of dotted line 9—9 of Fig. 1.

Fig. 9ᵃ is a fragmental plan view of certain driving elements.

Fig. 9ᵇ is a detail view of the shear-actuating cam.

Figure 2:
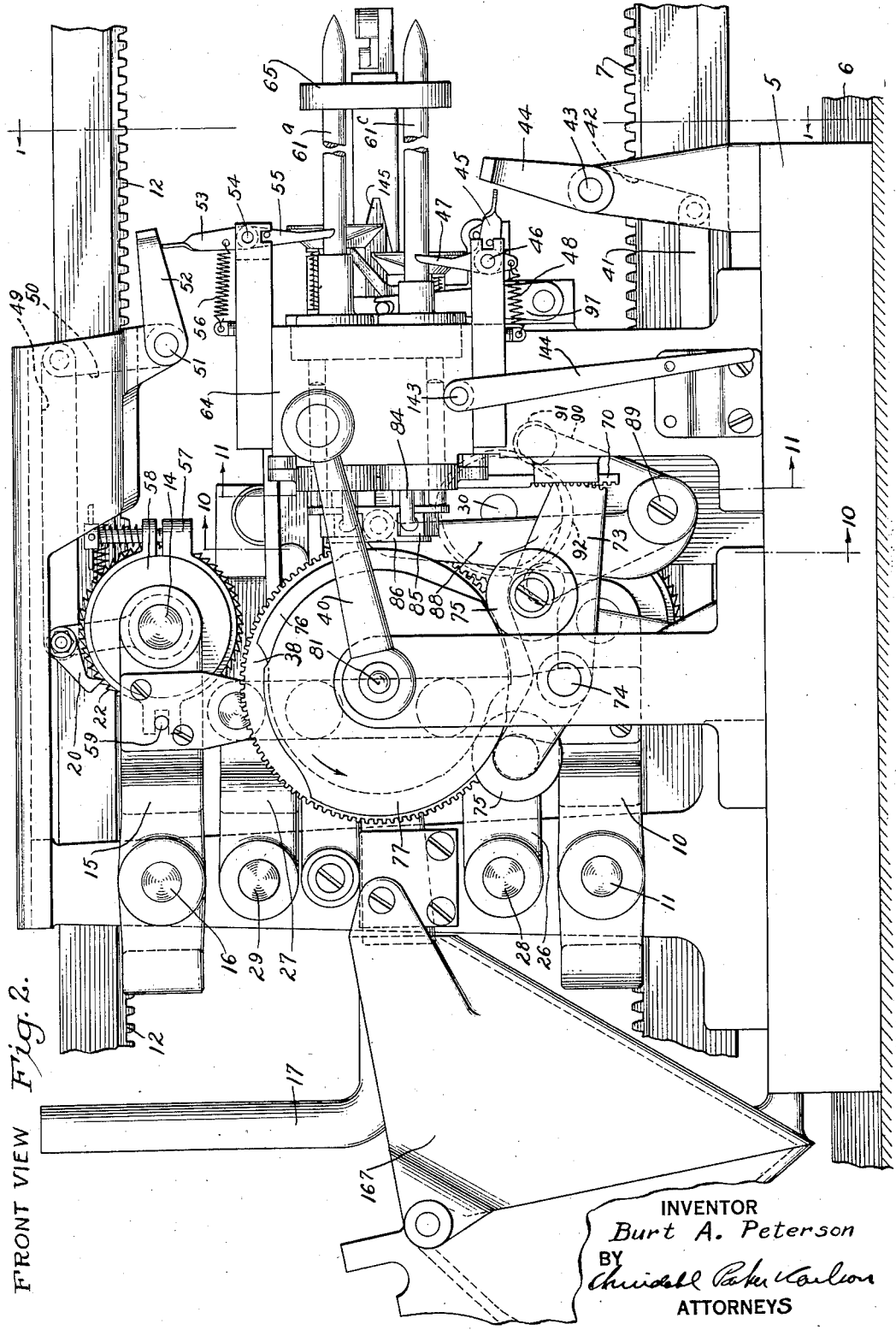
Fig. 2 is a fragmental front view of the machine.

Fig. 10 is a view taken approximately in the plane of line 10—10 of Fig. 2.

Fig. 11 is a view taken approximately in the plane of line 11—11 of Fig. 2.

Fig. 12 is a section on line 12—12 of Fig. 11.

Fig. 13 is a perspective view of the selectors and the stumbler mechanism.

Fig. 14 is a perspective view showing the shear mechanism in relation to the selector.

Fig. 15 is a fragmentary plan view showing a pair of threads as having been placed in operative relation to the knotter.

Fig. 16 is a fragmentary perspective view of the mechanism for removing waste thread ends.

Fig. 16ᵃ is a detail view of the plate 158.

Fig. 16ᵇ illustrates the operation of certain deflecting devices.

Fig. 17 is a fragmentary view of the means for placing the drive pinions in and out of engagement with the racks.

Fig. 18 is a fragmental view of the selector cam shown in Fig. 2, but in a different position.

Fig. 19 is a section on line 19—19 of Fig. 18.

Fig. 20 is a sectional view through the shaft 39.

Fig. 21 is a time chart.

The warp or warps to be operated upon may be supported in any preferred manner. The present embodiment of the invention being a machine for uniting two warps, means comprising two clamps 1 and 2 carried by the bed of the machine is provided for supporting a portion of the new warp in a horizontal plane, a portion of the old warp being supported in a horizontal plane above the new warp by means of two clamps 3 and 4 forming parts of a warp carriage. The threads are held tightly in the clamps. To facilitate the insertion of the warps in the clamps, means of any preferred character may be employed for raising the warp carriage and holding it in elevated position and for lowering the carriage.

The warp carriage may be supported for horizontal adjusting movement transversely of the warps by any preferred means, as, for example, that shown in the before-mentioned Bingham and Parker patent.

The thread selecting and uniting mechanism is mounted upon a carriage 5 arranged to travel upon a guide 6 on the bed of the machine in a direction transverse to the warps and between the vertical plane of the clamps 1 and 3 and the vertical plane of the clamps 2 and 4. The means for causing such traveling movement comprises a rack 7 (Figs. 1 and 17) fixed in the machine frame and a pinion 8 fixed upon a shaft 9 which is journaled in a forked lever 10 pivoted at 11 on the carriage 5. The warp carriage is given its adjusting movement by means of a rack 12 (Figs. 1 and 17) fixed to the framework of the warp carriage and arranged to be engaged by a pinion 13. Said pinion is fixed to a shaft 14 which is journaled in a forked lever 15 that is pivoted on the mechanism carriage at 16. The levers 10 and 15 are arranged to be swung to move the pinions 8 and 13 into and out of mesh with the racks 7 and 12, respectively, by means of a slide rod 17 (Fig. 17) which is connected to the levers 10 and 15 by means of links 18.

Figure 3:
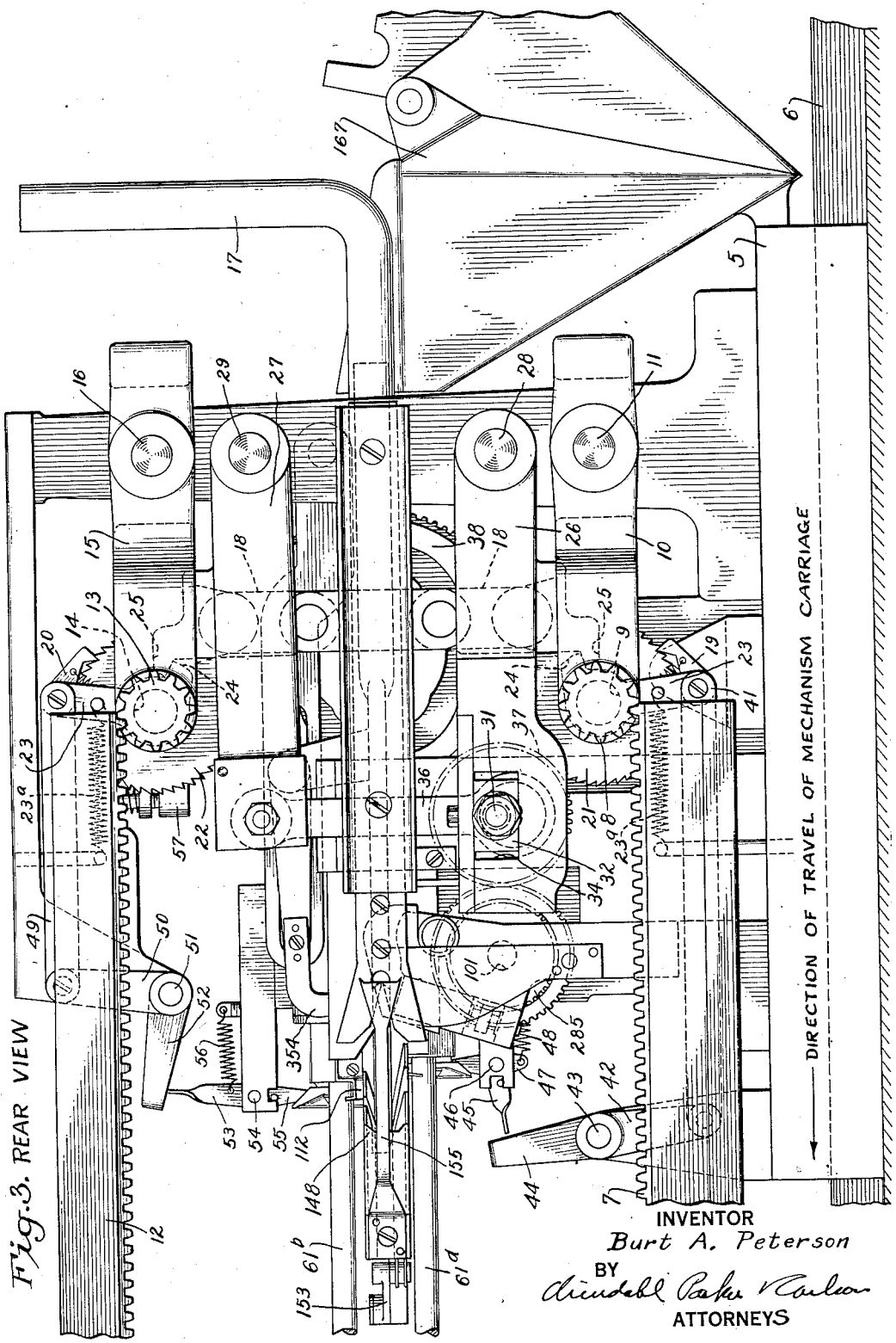
Fig. 3 is a fragmental rear view thereof.

The pinions 8 and 13 are intermittently rotated according to the necessities of the work by means of pawls 19 and 20 arranged to engage ratchet wheels 21 and 22, respectively. Said ratchet wheels are fixed upon the shafts 9 and 14, respectively. The pawls 19 and 20 are pivoted upon bell cranks 23 (Fig. 3) which are arranged to be swung in the direction to retract the pawls by means of contractile springs 23ª. Each of the bell cranks 23 comprises a short arm 24 which is arranged to be engaged by a projection 25. The projection 25 for actuating the lower feed pawl 19 is fixed to a lever 26. The other projection 25 is attached to a generally similar lever 27. These levers are pivotally supported on the mechanism carriage at 28 and 29, respectively. The means for oscillating the levers 26 and 27 comprises a shaft 30 (Figs. 9 and 9ª) having a crank pin 31 which is rotatable within a block 32 (Fig. 3), said block being mounted for sliding movement in an opening 34 in the lever 26. The shaft 30 also has an eccentric 35 (Fig. 9ª) which is connected to the lever 27 by means of a link 36 (Fig. 3). By the means described, the levers 26 and 27 are swung in unison toward and away from each other. The shaft 30 is driven by means of a pinion 37 which meshes with a gear wheel 38 fixed upon the main drive shaft 39. Means of any desired character may be provided for rotating the shaft 39, as, for example, a hand crank 40.

When the levers 26 and 27 swing toward each other the projections 25 cause the bell cranks 23 to swing in the direction to impart feed movements to the pawls 19 and 20. After such feed movements, the springs 23ª tend to restore the pawls to their initial position. Effective restoring movement is prevented when there is no need for relative feed movement between the warps and the selecting mechanism by the means to be now described.

A link 41 (Figs. 3 and 17) connects the lower bell crank 23 with a crank arm 42 which is fixed upon one end of a rock shaft 43 (Fig. 1). To the opposite end of the shaft 43 is fixed an arm 44 having an angular upper end. When it is not necessary that the mechansm carriage 5 be advanced toward the lower warp, the movement of the arm 44 under the tension of the spring 23ª is obstructed by a bell crank arm 45 (Fig. 2) which is pivoted upon the mechanism carriage at 46. The other arm 47 of said bell crank lever is lightly held in contact with the foremost thread of the lower warp by means of a contractile spring 48.

The operation of the upper feed pawl 20 is controlled in a similar manner, there being a link 49 (Fig. 3) which connects the upper bell crank 23 with a crank arm 50 which is fixed upon one end of a rock shaft 51. To the opposite end of the rock shaft 51 is fixed an arm 52, the angular end of which is arranged to be obstructed by the upper arm 53 of a lever pivoted on the mechanism carriage at 54. The lower arm 55 of said lever is held in contact with the foremost thread of the old warp by means of a contractile spring 56.

Referring to Fig. 17: 57 is a brake band which encircles a brake disk 58 that is fixed upon the upper pinion shaft 14. The brake band is held against rotation by means of a pin 59 (Figs. 2 and 4) on the lever 15. This brake prevents accidental or momentum movement of the warp carriage and frictionally locks the warp carriage and the main carriage together, such frictional engagement being overcome when the upper ratchet wheel is turned by its pawl. A similar brake 60 is provided for the lower pinion shaft 9 to prevent feed movement of the mechanism carriage from being continued through momentum or through accidental movement of the warp carriage.

It will be understood from the foregoing that the mechanism carriage 5 is fed step by step toward the new warp, the feed being controlled in accordance with the spacing of the threads of said warp, and that the warp carriage is moved step by step to feed the old warp toward the selecting mechanism to compensate for any difference in the widths of the old and new warps and for variations in the spacing of the threads of the old warp, said movement of the warp carriage being controlled by the threads of the old warp.

When the mechanism carriage is fed, the warp carriage moves with it (due to the fact that the upper pinion shaft 14 is frictionally held against rotation) unless the upper feed pawl 20 is actuated to feed the warp carriage in the opposite direction at the same time that the lower feed pawl 19 is actuated to feed the mechanism carriage, in which latter event the old warp remains stationary with reference to the new warp.

The devices for selecting individual threads from the warps are designed to select from a lease, the threads of each warp being crossed, as indicated in Figs. 1 and 5. In the body of the warp the lease is one and one, but in the selvage the lease is two and two, two threads being handled as one. The leasing or crossing of the threads may be accomplished in any desired manner. The threads are maintained in the leased condition by means of lease rods 61ª, 61ᵇ, 61ᶜ and 61ᵈ. These rods are withdrawably mounted in axial openings 62 (Figs. 7, 8, 11 and 12) of sleeves 63 which are supported for oscillation in bearings in a bracket 64 that forms a part of the mechanism carriage. The forward ends of the lease rods, that is to say, the ends projecting beyond the warp sections secured in the clamps 1, 2, 3 and 4 may be supported against sagging and kept properly spaced apart in any preferred way, as, by slipping on the forward ends of said lease rods a plate 65 perforated to receive said rods.

To the forward end of each sleeve 63 is fixed an oscillatory selecting wing A, B, C and D. Said wing tapers from its outer end toward its hub; and its forward and rear sides are inclined rearwardly from the broadened outer end toward the hub, as shown in Fig. 7. The outer end of each wing is curved concentrically with its sleeve 63. The two wings for a given warp are located at opposite sides of the crossing point of the threads of that warp and extend toward each other into close proximity to the crossing point. A thread is arranged to be selected each time the selecting wings swing across the horizontal plane of the crossing point (see Fig. 1a). The selecting wings are connected together to oscillate in unison, but in opposite directions, by means of a link 67 (Fig. 10) extending between crank arms 68 on said sleeves. The selecting wings for the two warps are oscillated in proper timed relation by means of two rack bars 69 and 70 (Fig. 11) which mesh with fragmental gears 71 fixed to the rear ends of one of the sleeves 63 for the old warp and one of the sleeves 63 for the new warp. The lower ends of the rack bars 69 and 70 mesh with gear teeth formed upon two levers 72 and 73 (Figs. 11 and 13), said levers being pivoted on the mechanism carriage at 74. Each of the levers 72 and 73 carries two anti-friction rollers 75 that run in contact with a double cam. One of these cams is indicated by the numeral 76, the other being numbered 77 (Figs. 18 and 19.) These cams are arranged to be driven by the shaft 39 but in order that the relative positions of the selecting mechanisms for the two warps may be changed to correspond to the positions occupied by the foremost thread of each warp, the cam 76 is fixed to the shaft 39, whereas the other cam is adjustably connected to said shaft by means of a key 78 that extends through a slot 79 in the shaft 39. The ends of the key 78 extend into keyways 80 in the cam 77. The key 78 is secured to a rod 81 that extends sliadbly through an axial bore in the shaft 39. An expansion spring 82 normally holds the key 78 in the keyways 80, but by pressing against the outer end of the rod 81 the key may be withdrawn from the keyways. Thereafter the cam 76 may be turned through a half-revolution, the cam 77 being meanwhile held against rotation through the pressure of the rollers 75.

As indicated in the time chart, Fig. 21, which shows the operations that occur during one revolution of the shaft 39, each selector wing is swung through an arc of 40°, whereupon the selector wing stops while the shaft 39 turns through 90°, after which the selector wing swings through an additional 20°. In such 60° swinging movement a side edge of the wing is inserted between the thread next to be taken and the remaining threads of the warp, but in order to make such selection more certain I provide for each selector wing a pusher finger 83 (Figs. 6 and 7). Each pusher finger is fixed to a rod 84 which is pivotally and slidably mounted in a bore extending longitudinally within the sleeve 63 of the associated selector wing. The finger 83 is grooved near its outer end to engage the thread which is next behind the thread to be selected. The two pusher fingers for a given warp are always directed toward each other so as to be adapted to engage the same thread at opposite sides of and close to the crossing point; and in the oscillations of the sleeves 63 the fingers 83 shift so as to be in position to press back the thread that is next to the thread to be selected by the selecting wings. As shown in Fig. 7, the face of each selector is recessed or cut away to accommodate the relative swinging movements which occur between the selector and the pusher finger, and to allow the pusher finger, when retracted, to lie flush with or back of the plane of the outer end of the selector. Since the fingers 83 operate close to the crossing point they are in position most effectively to create a space between the thread to be selected and the remaining threads into which the selecting wings may enter to separate the selected thread from its warp.

Referring to Figs. 10 and 12, the angular rear ends of the rods 84 for a given warp are slidable in openings in the ends of a block 85, said block serving to hold the pusher fingers directed toward each other at all times. The pusher fingers are reciprocated toward and away from the warp by means of a slide 86 having bifurcated ends to receive the blocks 85. Attached to said slide are two guide studs 87 which are slidable in openings in the bracket 64. The slide has a pin and slot connection with an arm 88 pivoted at 89 on the mechanism carriage. Rigid with the arm 88 is an arm 90 carrying two rollers 91 (Fig. 2) that engage a double cam 92 (Figs. 2 and 10). Said cam is rigid with the gear wheel 37.

In order to release the selected threads from the clamps 1 and 3, I provide two shears, one for each warp. Each shear is located directly behind the associated selecting wings and in the vertical plane of the crossing points of the given warp. Referring first to the old-warp shear, it consists of a stationary blade 93 (Figs. 4 and 14) which is secured to the bracket 64, and a blade 94 that is pivoted to the blade 93 at 95. Rigid with the blade 94 is an arm 96 having a pin and slot connection with an arm 97. The last-mentioned arm is rigid with an arm 98 carrying a roller 99 that runs in a cam groove 100 (Fig. 9b) formed in one side of a gear wheel 100a carried by a shaft 101. Said gear meshes with the gear 37.

The new-warp shear consists of a fixed blade 102 (Fig. 14) and a movable blade 102a, the latter having a pin-and-slot connection with the arm 97.

In order to prevent the useful end of the selected thread from jumping out of control upon severance, I provide for each warp a clamp located on the back of one of the selecting wings and close to the corresponding shear. As shown in Figs. 7 and 12, a clamping surface 103 is formed on each of the selecting wings B and D to coact with a clamp member 104 carried by a slide 105. Said slide is mounted in a guideway 106 on the sleeve 63. 107 (Figs. 6 and 7) is a cover plate for the guideway. An expansive spring 108 tends to move the clamp member 104 into effective position. The clamp member 104 is withdrawn from such position by a cam 109 (Fig. 8) formed on a plate 110, attached to the bracket 64, said cam operating upon a stud 111 carried by the slide 105. In the oscillations of the selecting wing the spring 108 and the cam 109 move the member 104 into and out of clamping position.

The pair of selected and severed threads (one thread from each warp) is advanced to the uniter by means of a fork. Means are provided to bring the selected and severed threads close enough together to be received between the tines of the fork. The threads that extend above the rod 61b and those that pass under the rod 61d are moved closer together by means of two positioning members, one for each warp, said members being attached to the sleeves that carry the wings B and D. Each positioning member is approximately diametrically opposite the wing with which it is associated. In the present construction, the positioning members are formed of sheet metal, the angular portions 112 (Fig. 5) being so located that when an old-warp thread that extends above the rod 61$^b$ and a new-warp thread that passes under the rod 61$^d$ are selected, said portions 112 swing against said threads and deflect them into the path of the before-mentioned fork. The portion 113 of each positioning member serves as a guard to prevent the adjacent unselected thread from fouling on the portion 112.

Old-warp threads that extend below the rod 61$^b$ and new-warp threads that pass over the rod 61$^d$ are brought closer together so as to be receivable in the before-mentioned fork, by means of shoulders 114 (Fig. 16$^b$) formed on the rear sides of the selectors B and D, said shoulders deflecting the selected threads into the path of said fork.

The means for advancing a pair of selected threads to the uniting means comprises a slide 115 (Figs. 4 and 9) which reciprocates in the space between the two warps and is guided in openings 116 and 117 (Figs. 9 and 10). A lug 118 (Fig. 9) on the lower side of the slide is connected through a link 119 to an arm 120 that is pivoted at 121. Rigid with the arm 120 is an arm 122 which is connected through a pitman 123 with a crank pin 124 on the gear wheel 37. Due to the ratio between the gears 37 and 38, the slide 115 is given two reciprocations (i. e. four strokes) in each revolution of the driving shaft 39.

If for any reason a single thread is selected, the slide 115 should not be permitted to advance it to the knotter. I therefore provide two feelers or "stumblers" 125 and 126 for the old and the new warp, respectively (Figs. 9 and 13). These stumblers are in the form of levers pivoted at 127 and 128, respectively, the upper ends of said levers extending transversely of and directly behind the threads of their warps, and being lightly pressed toward the warps by torsion springs 129. Rigid with the levers 125 and 126 are arms 130 and 131, respectively. A bell crank 132 pivoted at 133 carries a roller 134 that engages a cam 135 (Figs. 9 and 10) on the side of the gear 37. A contractile spring 136 tends to hold the roller against the cam. As shown in Fig. 9, the major portion of the periphery of the cam 135 is concentric with the axis 39, there being a notch 137 in said periphery at one point. On the bell crank 132 is a stop shoulder 138, and on the pitman 123 is a coacting lug 139. When the roller 134 is allowed to roll along the bottom of the notch 137 under the influence of the spring 136, the shoulder 138 is removed from the orbit of the lug 139 before the latter reaches the shoulder. The bell crank 132 has a lug 140. When either of the stumblers is held by its spring 129 in a position farther forward than normal, due to failure of the associated selecting wings to select a thread, the corresponding arm 130 or 131 is in the path of the lug 140 at the moment the depression 137 allows the spring 136 to swing the bell crank toward said arm 130 or 131. Consequently the bell crank is not permitted to make its normal movement under the influence of the spring 136, and hence the operation of the machine is arrested through collision of the lug 139 with the shoulder 138, the slide 115 being arrested in approximately its retracted position. Upon correction of the difficulty the stumbler arm is withdrawn from the path of the lug 140, thus permitting resumption of operations.

When desired the stumblers may be held in inoperative position by means of a lever 141 adapted to depress the arm 130 below the path of the lug 140, said lever having an inclined surface 142 adapted to move the arm 131 aside out of the path of said lug. The lever 141 is carried by a shaft 143 to which is attached a hand lever 144.

Figure 4:
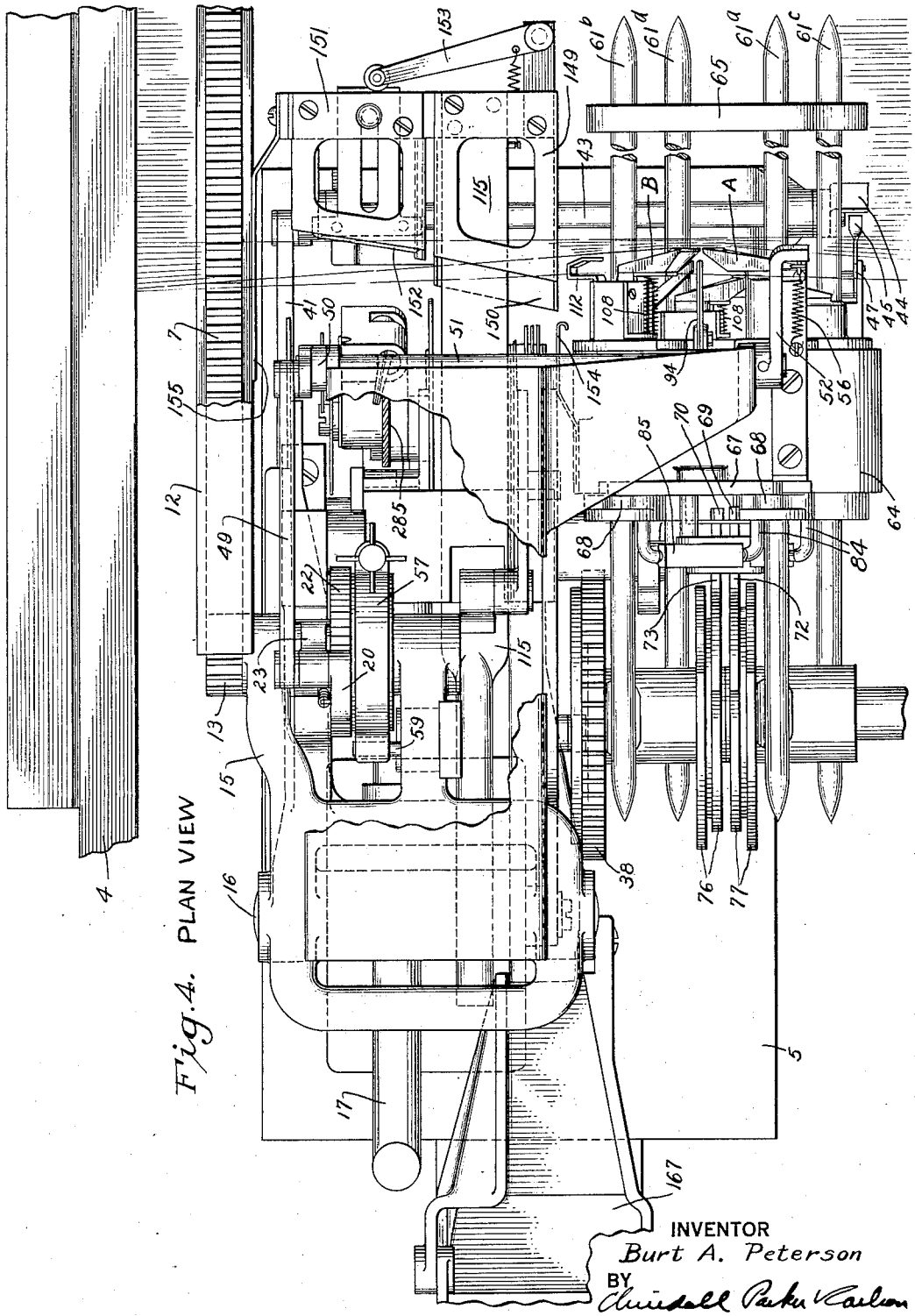
Fig. 4 is a fragmental plan view of the machine.

Forks 145, 146, 147 and 148 (Fig. 5) are fixed to the slide 115. Extending above and joining the forks 145 and 146 is a separating blade 149, and below said forks is a similar separating blade 150 (Fig. 4). A separating blade 151 extending above and between the forks 147 and 148 forms virtually a continuation of the blade 149. A blade 152 extending between the forks 147 and 148 forms a continuation of the blade 150 when said blade is in its forward position, but it is mounted to yield upon contact with the knotter, being slidably supported on the slide 115 and normally held forward by a spring-pressed arm 153.

The thread-engaging edges of the blades 149, 150, 151 and 152 are inclined from a right angle with the direction of their reciprocatory movement, the leading corners of the blades 149 and 150 being at the side toward the selecting devices. The forks 145, 146, 147 and 148 serve to cam or crowd the two selected threads toward each other and carry them to the knotter. The closed ends of the forks 145, 146 and 147 are in a line perpendicular to the direction of reciprocation of the slide. The points of the fork 145 enter the spaces formed between the selected threads and the next adjacent threads by the members 112, and thus set off the selected threads from their respective warps. The blades 149, 150, 151 and 152 complete the separation initiated by the selecting wings and continued by the members 112 and the forks 145, 146, 147 and 148.

To keep the selected threads from jumping out of control while they are being advanced to the knotter I employ a spring blade 154 (Figs. 5 and 15) which is attached to the bracket 64 in position to bear against the side of the fork 145 as the latter advances. When the tines of the fork first engage the spring blade 154, the latter serves to close the front end of the fork so as to prevent the threads from jumping out of the fork. Later on, the blade 154 clamps the threads against the side of the fork, as shown in Fig. 15.

The particular form of uniter used in the present embodiment of the invention is a knot-tying mechanism similar to the one fully disclosed in the Alford Patent No. 1,245,418. The tying bill 279 (Fig. 15) is rotated by means of spiral gears 285 and 286 (Figs. 1 and 15). The gear 285 is fixed upon the shaft 101.

The united threads are withdrawn from the vicinity of the knotter by a fork 155 (Figs. 3 and 4) attached to the slide 115.

The waste ends sheared off the knot by the tying bill are removed by a hook 354 actuated as described in the Alford patent. In the present machine the tube or passageway 252 through which the hook 354 pushes the waste ends is covered by a plate 156 (Fig. 5) which is slidable longitudinally of said passageway. In the plate 156 is an opening 157 through which the hook 354 operates up and down. The cover plate 156 assists in preventing the waste ends from escaping from the tube 252.

When the selected threads are advanced to the knotter, the portions destined to become waste are inserted into a tensioning or controlling device located at the entrance to the waste tube 252. This device comprises five spaced elements, namely, a plate 158 (Fig. 16) having a flaring throatway 159 and a dovetail slot 160, three elements 161, 162 and 163 forming a grid, and a fork 164. The forks on the separator slide 115 insert the selected threads in the slot 160, the grid 161, 162 and 163 and the fork 164, the arcs of contact of the threads with the grid elements causing sufficient friction to hold the threads against escaping before the stripper hook 354 can draw them into the tube 252.

In the Alford construction the stripper hook drew the waste ends through the narrow passageway 364 shown in the plan view, Fig. 5, of the Alford patent, the opposite side walls of said passageway being relatively stationary. When handling rayon and similar wiry yarns, it is desirable to exert a clamping action on the waste ends in the passageway and obstruct their return; hence one side of the passageway comprises a block 165 (Fig. 16) which is yieldingly held against the opposite side of the tube 252 by a plurality of expansion springs 166. After the waste ends have been drawn to and past said block, they are held against return movement. Successive pairs of waste ends push previously inserted ends along in the tube 252 until they finally emerge into a receptacle 167 on the mechanism carriage.

The particular embodiment herein shown of the invention is so proportioned as to receive only a portion (about fifteen inches in width) of each of the warps to be united, but it will be understood that the invention may be embodied in a machine capable of receiving all of the threads of the warps.

Figure 21 is a chart which shows with precision the timing of the various mechanisms referred to in the following summary of the operation. The chart shows the various operations that occur while the shaft 39 is making one revolution.

In operation, the mechanism carriage is fed toward the warps so as to maintain the foremost several threads of each warp bowed or pressed ahead, as shown in Fig. 15, thus placing them under tension tending to cause them to spring rearwardly. The selecting action will be best understood by reference to Fig. 5, which shows the selector wings at rest after having completed their first angular movement of 40°. The old-warp thread $a$ and the new-warp thread $a'$ have just been selected, clamped and deflected into the path of the fork 145. The clamping action of the jaws 104 occurs as the selectors come to rest in the dwell position. The shearing takes place after the threads have been thus clamped and after the slide 115 has advanced far enough to cause the tines of the fork 145 to have lapped the spring plate 154. The selector wings remain in the dwell position until the 184° position has been reached. In the meantime the threads are sheared. As the slide advances after the shearing, the threads are pulled from the clamps 104, the spring plate 154 by this time having clamped the threads.

As the selectors A and B complete their stroke they reach the full-line positions shown in Fig. 1a. The front faces of the selectors being inclined rearwardly, as shown in Fig. 7, the thread $b$ (Fig. 5) which is next to be taken is allowed to spring rearwardly along the faces of the selectors and away from the thread $c$. The selectors remain in the full-line position shown in Fig. 1a during 210° of rotation of the shaft 39. Before the selectors A and B begin to swing into the dotted-line position shown in Fig. 1a to select the thread $b$ (Figs. 5 and 6), the pusher fingers 83 push the thread $c$ toward the warp and away from the thread $b$, thus widening whatever space may have been formed between the threads $b$ and $c$ by the rearward movement of the thread $b$ along the front faces of the selectors. It will be seen that the pusher fingers move the threads not to be selected, away from the threads next to be selected, thereby providing a definite space of ample size for the entrance of the corners of the selectors. 34° of rotation after the pusher fingers reach their foremost position, the selectors commence to swing toward their dotted-line positions as illustrated in Fig. 1a, in which operation the corners of the selectors are inserted into the spaces produced by the pusher fingers, and the inclined rear sides of the selectors cam the thread $b$ rearwardly into the open shear 93—94 and the open clamp 103—104. (As shown in Fig. 6, the guard portion 113 prevents the thread $b$ from moving rearwardly into position above the angular portion 112.) A moment before the shear severs the thread the clamp closes so as to hold the useful end from springing out of control. The forks 145 and the plates 149 and 151 continue the separation between the threads $b$ and $c$ which was initiated by the selectors and pushers, and the forks 145, 146, 147 and 148 move the thread to the knotter. As the thread is being moved to the knotter, it slips out of the clamp 103—104, is held between the side of the fork 145 and the clamp member 154, and is inserted into the tensioning device 161—162—163 and the dovetail slot 160. After the knot has been formed and the waste end trimmed off by the tying bill the waste end is withdrawn by the hook 354.

The selection of a thread causes the stumbler 125 or 126 (Fig. 13) to be pressed back so as to allow the stop shoulder 138 to be moved by the spring 136 out of the way of the lug 139. Any failure to select a thread from one warp leaves the corresponding stumbler in such position as to cause the slide 115 to be arrested, thus preventing a thread from the other warp from being carried to the knotter. In case only one thread is selected, the stop shoulder 138 stops the machine before the selected thread is sheared.

The sensitive feelers 47 and 55 permit the feed for the mechanism carriage and the feed for the warp carriage to operate whenever necessary to keep the selectors properly pressed against the warps.

It should be understood that while the mechanism herein disclosed is particularly well adapted to operate upon such wiry and slightly elastic material as rayon and celanese it is also adapted to handle cotton, silk, etc.

In the following claims the term "thread" has been used for the sake of brevity to denote any analogous material, and the term "machine for operating upon warps" is intended to include warp-tying machines, warp-twisting machines, warp-drawing machines, etc.

I claim as my invention:

1. A warp-uniting machine having, in combination, a pair of clamps for tightly clamping a new warp, another pair of clamps for tightly clamping an old warp, said warps being supported in generally parallel position, each warp being leased between its clamps, selecting means for the new warp, selecting means for the old warp, said selecting means operating adjacent to the crossing points of the threads and relatively near one clamp of each pair, a shear for each warp, said shears being located adjacent to the crossing points, a uniter located between the two selecting means and the other clamp of each pair, means for advancing the selected threads to the uniter, means to clamp for a time each selected thread at a point between the shear and the advancing means, and means to place tension on the selected threads after said clamping means has released the threads and while the uniter is forming the union.

2. A warp-uniting machine having, in combination, a pair of clamps for tightly clamping a new warp, another pair of clamps for tightly clamping an old warp, said warps being supported in generally parallel position, each warp being leased between its clamps, selecting means for the new warp, selecting means for the old warp, said selecting means operating adjacent to the crossing points of the threads and relatively near that clamp of each pair which holds the ends that are destined to become waste, a shear for each warp, said shears being located adjacent to the crossing points, a uniter located between the two selecting means and the other clamp of each pair, and means for advancing the selected and severed threads to the uniter.

3. A machine for operating upon warps, having, in combination, means for holding a leased warp, means for selecting threads from the warp, means for pushing the adjacent threads away from the thread to be selected and away from the selecting means, said pushing means acting adjacent to the point of selection, means for advancing the selected thread to the point of use, and means for moving the selected thread into position to be taken by said advancing means.

4. A warp-uniting machine having, in combination, means for holding a pair of leased warps, means for selecting threads from both warps, means for pushing the adjacent threads away from the threads to be selected and away from the selecting means, said pushing means acting adjacent to the point of selection, a uniter, means for advancing selected threads to the uniter, and means for moving the selected threads toward each other into position to be taken by said advancing means.

5. A warp-uniting machine having, in combination, means for holding a pair of leased warps, selectors for selecting threads from both warps, said selectors oscillating in planes that are approximately perpendicular to the planes of the warps, a uniter, means for advancing selected threads to the uniter, and means for moving the selected threads toward each other into position to be taken by said advancing means said thread-moving means being attached to those selectors that are adjacent to the uniter.

6. A warp-uniting machine having, in combination, means for holding a pair of leased warps, means for selecting threads from both warps comprising two oscillatory wings, one for each warp, means for pushing the adjacent threads away from the threads to be selected, said pushing means acting adjacent to the point of selection, a uniter, means for advancing selected threads to the uniter, and means for deflecting the selected threads toward each other into position to be taken by said advancing means, said deflecting means comprising two elements each mounted approximately diametrically opposite one of said wings.

7. A warp-uniting machine having, in combination, means for holding a pair of leased warps, means for selecting threads from both warps comprising two oscillatory wings, one for each warp, a uniter, means for advancing selected threads to the uniter, and means for deflecting the selected threads toward each other into position to be taken by said advancing means, said deflecting means comprising two elements each attached to and located approximately diametrically opposite one of said wings.

8. A machine for operating upon warps having, in combination, means for supporting a leased warp, two selectors extending toward the crossing point of the threads, means for reciprocating said selectors to insert them between the foremost thread and the next adjacent thread, means for severing the selected thread close to the crossing point, and a clamp adjacent to the selector and the severing means to receive and clamp the selected thread prior to severance and hold one of the severed ends.

9. A machine for operating upon warps having, in combination, two lease rods over which a warp is leased, the crossing point being between the rods, two selector wings extending toward the crossing point, means for oscillating said selector wings, each wing swinging on the axis of one of said lease rods, means for severing the selected thread adjacent to the crossing point, and a clamp on the rear side of one of the selector wings for holding one of the severed ends.

10. A machine for operating upon warps having, in combination, means for supporting a warp, a reciprocatory selector for setting off the foremost thread from the next adjacent thread, means for severing the selected thread adjacent to the point of selection, and a clamp carried on the rear side of the selector for holding one of the severed ends.

11. A machine for operating upon warps having, in combination, two lease rods over which a warp is leased, the crossing point being between the rods, two selectors, means for reciprocating said selectors in opposite directions to insert them between the foremost thread and the next adjacent thread, means for severing the selected thread at a point adjacent to the selectors, and a clamp located rearwardly of one of the selectors with respect to the direction of relative feed movement between the warp and the selectors, severing means and clamp for holding one of the severed ends and means for causing a relative feed movement between the warp on the one hand and the selectors, severing means and clamp on the other.

12. A machine for operating upon warps having, in combination, lease rods over which a warp is leased, the crossing point being between the rods, two selector wings extending toward the crossing point, means for oscillating said selector wings in unison, but in opposite directions, said wings swinging on axes located at opposite sides of the crossing point, means for severing the selected thread adjacent to the crossing point, and a clamp on the rear side of one of the selector wings for holding one of the severed ends.

13. A machine for operating upon warps having, in combination, means for supporting a leased warp, two oscillatory selectors extending toward the crossing point of the threads, means for oscillating said selectors in unison but in opposite directions, and means reciprocating transversely of the plane of oscillation of the selectors and toward and away from the selectors for pushing away from the selectors the threads adjacent to the thread to be selected.

14. A machine for operating upon warps having, in combination, two lease rods over which a warp is leased, the crossing point of the threads being between the rods, two pushers acting adjacent to and at opposite sides of the crossing point for pushing away the threads adjacent to the thread to be selected, and means for selecting the last-mentioned thread, said pushers serving to push said adjacent threads out of contact with the selecting means.

15. A machine for operating upon warps having, in combination, two lease rods over which a warp is leased, the crossing point of the threads being between the rods, two selectors extending toward the crossing point, means for oscillating said selectors in unison but in opposite directions, and means acting adjacent to the crossing point for pushing away from the selectors the threads adjacent to the threads to be selected.

16. A machine for operating upon warps having, in combination, two lease rods over which a warp is leased, the crossing point of the threads being between the rods, two selectors each oscillating on the axis of one of said rods and extending toward the crossing point, and means acting adjacent to the crossing point for pushing away from the selectors the threads adjacent to the thread to be selected.

17. A machine for operating upon warps having, in combination, two lease rods over which a warp is leased, the crossing point of the threads being between the rods, means acting adjacent to the crossing point for pushing away the threads adjacent to the thread to be selected, and selecting means insertable into the space produced by the pushing means, said pushing means serving to push said adjacent threads out of contact with the selecting means.

18. In a thread-selecting means, a selecting wing, means for oscillating said wing, a pusher finger pivotally supported on the wing and directed toward the outer end of the wing, and means for reciprocating said finger longitudinally of the axis of the wing.

19. A machine for operating upon warps, having, in combination, means for holding a leased warp, means comprising an oscillatory wing for selecting a thread from the warp, means for advancing the selected thread to the point of use, and means for moving the selected thread into position to be taken by said advancing means, said moving means being attached to the wing at the other side of the axis of the wing.

20. A machine for operating upon warps, having, in combination, means for holding a leased warp, means comprising an oscillatory wing for selecting a thread from the warp, means for pushing the adjacent threads away from the thread to be selected, said pushing means acting adjacent to the point of selection, means for advancing the selected thread to the point of use, and means for deflecting the selected thread into position to be taken by said advancing means, said deflecting means being attached to said wing at the other side of the axis of the wing.

21. In a machine for operating upon a warp, a sleeve having an axial opening for a lease rod, means to oscillate the sleeve, a selector wing rigid with one end of said sleeve, a clamp member mounted on the sleeve and guided for movement longitudinally thereon, a spring tending to move the clamp member toward the selector wing to clamp a selected thread, and a cam arranged to move said clamp member against the tension of the spring and to allow the spring to act as the sleeve is oscillated.

22. In a machine for operating upon a warp, a sleeve having an axial opening for a lease rod, means to oscillate the sleeve, a selector wing rigid with one end of said sleeve, a clamp member mounted on the sleeve and guided for movement longitudinally thereon, a spring tending to move the clamp member toward the selector wing to clamp a selected thread, and means to operate the clamp member against the tension of the spring.

23. In a machine for operating upon a warp, a sleeve having an axial opening for a lease rod, means to oscillate the sleeve, a selector wing rigid with one end of said sleeve, a clamp member mounted on the sleeve and guided for movement longitudinally thereon, and means to operate the clamp member.

24. In a machine for operating upon a warp, a selector wing having a hub, the rear side of the wing being inclined toward the hub, and a clamping member located adjacent to the rear side of the wing to clamp a thread between the wing and the member.

25. In a machine for operating upon a warp, an oscillatory sleeve, a lease rod extending axially through the sleeve, a selector wing projecting approximately radially from the sleeve to select a thread extending across the lease rod, and a member projecting from the sleeve at a point opposite to the selector wing for deflecting the selected thread.

26. In a machine for operating upon a warp, a selector wing having a hub and a thread-deflecting member, said wing and member projecting from the hub in approximately diametrically opposite directions.

27. In a machine for operating upon a warp, a selector wing having a hub and a thread-deflecting member, there being a thread-deflecting part on said hub, said part and thread-deflecting member being at opposite sides of the hub.

BURT A. PETERSON.